United States Patent [19]

Miller

[11] Patent Number: 4,948,185

[45] Date of Patent: Aug. 14, 1990

[54] HATCH COVER ASSEMBLY

[75] Inventor: Roy W. Miller, Highland, Ind.

[73] Assignee: Pullman Leasing Company, Chicago, Ill.

[21] Appl. No.: 396,138

[22] Filed: Aug. 21, 1989

[51] Int. Cl.$^5$ ............................................. E05C 15/00
[52] U.S. Cl. ................................................ 292/256.5
[58] Field of Search ...................... 292/113, 247, 256.5, 292/257, 259, 260, DIG. 31, DIG. 49, DIG.60 256; 220/314

[56] References Cited

U.S. PATENT DOCUMENTS

| 2,551,534 | 5/1951 | Goshe | 292/113 |
| 2,901,279 | 8/1959 | MacNaught | 292/256.5 |
| 2,939,734 | 6/1960 | Chaud-Mantle | 292/247 |
| 4,655,365 | 4/1987 | Miller | 292/256.5 |

FOREIGN PATENT DOCUMENTS 549989  12/1922  France ................................ 292/347

Primary Examiner—Robert L. Wolfe
Attorney, Agent, or Firm—Richard J. Myers

[57] ABSTRACT

The invention is of a hatch assembly that includes a hatch cover adapted to seal a hatch opening defined by a raised combing of a deck. A locking arm having a hinge end and a lacth end extends across and beyond the hatch, and has a hatch clip adjacent each end to floatingly connect the locking arm to the hatch cover. A latch is mounted to pivot arms to engage latch engagement structure on the locking arm with a force dependent on the height of the pivot arms from the deck. An adjustment member includes tool bearing surfaces to enhance the rotation of the adjustment member and thereby adjust the force. A latch handle includes a stiffening member to strengthen the handle against forces tending to rotate the latch handle about the pivot arms. A pair of hinge bracket walls are mounted to the hatch combing and define a hinge bracket space between them. A stop is affixed to the bracket walls to prevent the hatch cover from contacting the horizontal deck surface. The hatch clip at the hinge end of the locking bar includes a flat clip base joined to two clip side walls by repective clip arcuate portions. The clip side walls fit outwardly of a hinge member within the bracket space. Shim are located between the clip side walls and the hinge member to bias the hinge member inwardly of the clip side walls and into abutment with the flat clip base.

5 Claims, 4 Drawing Sheets

FIG. 4
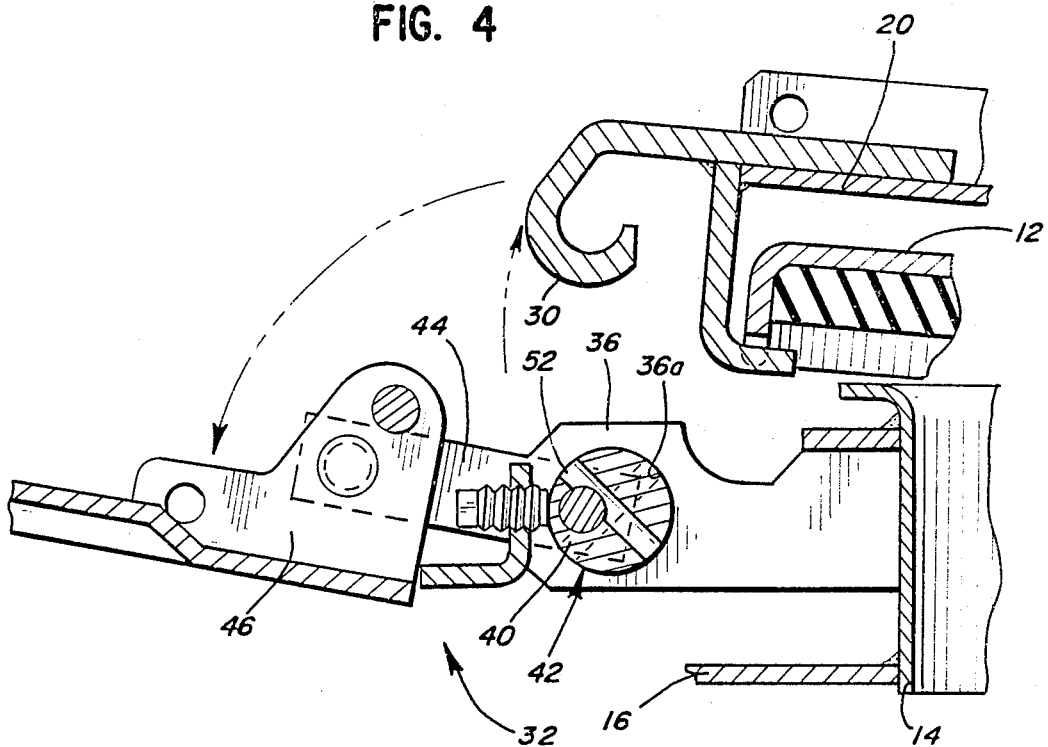
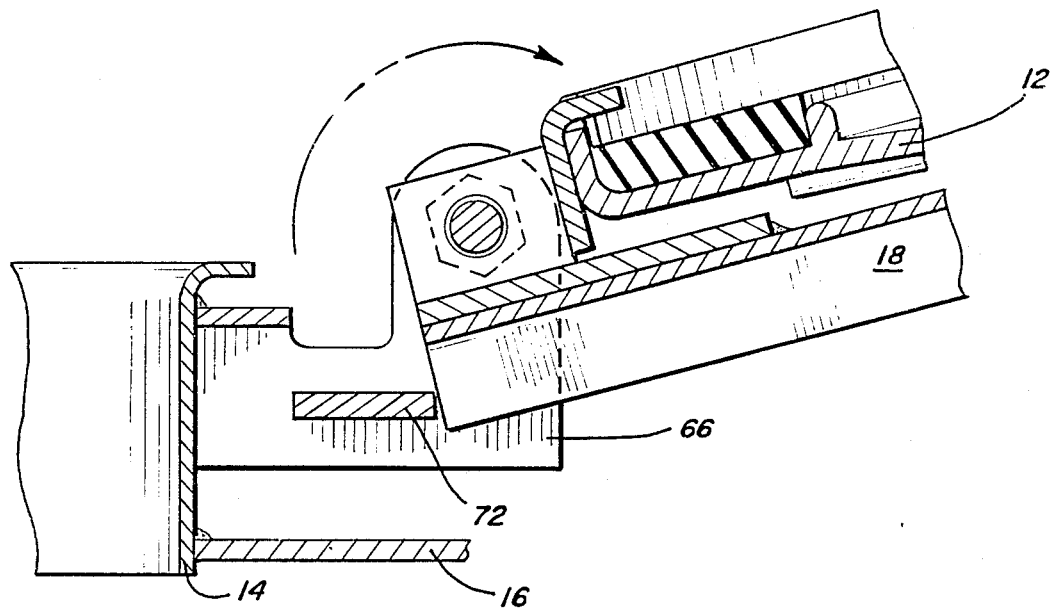
FIG. 5

HATCH COVER ASSEMBLY

BACKGROUND OF THE INVENTION

This application relates to hatch covers for cargo carrying vessels such as the hopper of a railway covered hopper car and latch structures for such hatch covers, and is a continuation in part of U.S. application entitled "Hatch Cover Assembly" U.S. Ser. No. 07/353,543, Filed 05/18/89.

Locking arrangements for lockingly sealing a hatch cover to a hatch opening defined by a combing of a vessel such as a railway covered hopper car are old and well known. The contents laded in a given vessel may have properties such that excessive pressures build up inside the vessel when the hatch is sealed. When the locking arrangement of the hatch cover is released, the excess pressure may swing the hatch cover open with considerable force potentially damaging the apparatus. To prevent this, the locking arrangement may be designed to retain the hatch cover in an intermediate "blow-off position" where the hatch cover is free to move and vent excessive pressure, but is restrained against larger movements potentially causing harm.

A number of patents have issued relating to hatch covers among which are the following:

U.S. Pat. No. 4,690,070 issued to Roy W. Miller on Sept. 1, 1987, describing a HATCH COVER STRUCTURE to include a clip securing the hatch cover to a hold down bar.

U.S. Pat. No. 4,655,365 issued to Roy W. Miller on Apr. 7, 1987, describing a HATCH COVER LOCK to include a stop member which supports the hatch cover when the hatch cover is pivoted open.

U.S. Pat. No. 4,622,902 issued to Roy W. Miller on Nov. 18, 1986, describing a HATCH COVER AND LOCKING STRUCTURE to achieve adjustable sealing pressure.

U.S. Pat. No. 4,570,816 issued to Ferris et al. on Feb. 18, 1986, describing a HATCH COVER AND LOCKING STRUCTURE to achieve adjustable sealing pressure.

U.S. Pat. No. 4,388,873 issued to Carleton et al. on June 21, 1983, describing a RAILROAD VEHICLE to include a catch which prevents the hatch from being blown open.

U.S. Pat. No. 4,248,160 issued to Carney, Jr. on Feb. 3, 1981, describing a RAILWAY HATCH COVER COVER AND STRAP LATCHING ASSEMBLY which includes a over center latch handle with a longitudinal stiffening member.

U.S. Pat. No. 3,228,353 issued to Carney, Jr. on Aug. 5, 1963, describing a HATCH COVER STRUCTURE FOR RAILWAY CARS.

U.S. Pat. No. 1,613,830 issued to Hull on Jan. 11, 1927, describing a VENTILATING DOOR FOR THE HATCHWAYS OF REFRIGERATING CARS.

Despite the foregoing, improvements in the manner of maintaining sealing pressure, insuring ease of rotation of the hatch and preventing damage to the latch handle and hatch were desirable.

SUMMARY OF THE INVENTION

The hatch assembly of the present invention includes a hatch cover adapted to seal a hatch opening in a deck defined by a raised combing. A locking arm having a hinge end and a latch end extends across and beyond the hatch, and has a hatch clip adjacent each end to floatingly connect the locking arm to the hatch cover. A hinge member affixed to the hinge end of the locking member is pivotally mounted to hinge bracket means affixed to the combing to allow the hatch cover to be pivoted open or closed. A latch engagement structure at the latch end of the locking bar engages latch structure affixed to the combing to seal the hatch. The latch structure includes a latch bracket rotatably supporting an elongate adjustment member to adjust the sealing pressure between the hatch and the hatch opening. Pivot means is eccentrically mounted from the axis of rotation of the adjustment member and varies the height of the pivot means from the horizontal deck. A latch is mounted to the pivot means to engage the latch engagement structure with a force dependent on the height of the pivot means from the deck. The adjustment member includes tool bearing surfaces to enhance the rotation of the adjustment member. The latch has a latch handle extending inwardly toward the center of the hatch opening from the pivot means. The latch handle includes a stiffening member to strengthen the handle against forces tending to rotate the latch handle about the pivot means. The hinge bracket means includes a pair of hinge bracket walls mounted to the combing and defining a hinge bracket space between them. A stop means is affixed to the bracket means to prevent the open hatch cover from contacting the horizontal deck surface. The hatch clip at the hinge end of the locking bar includes a flat clip base joined to two clip sidewalls by respective clip arcuate portions. The clip side walls fit outwardly of the hinge member within the bracket space. Shim are located between the clip side walls and the hinge member to bias the hinge member inwardly of the clip side walls and into abutment with the flat clip base.

BRIEF DESCRIPTION OF THE DRAWING

FIG. 4 is a partial sectional view of the present invention showing the locking means of the present invention.

FIG. 5 is a side sectional view showing the stop means of the present invention.

DETAILED DESCRIPTION OF THE DRAWING

The hatch cover assembly of the present invention is an improvement to structure disclosed in U.S. Pat. Nos. 4,690,070 and 4,655,365 to Roy W. Miller, the inventor of the present invention. Each is hereby incorporated by reference.

Figure 1:
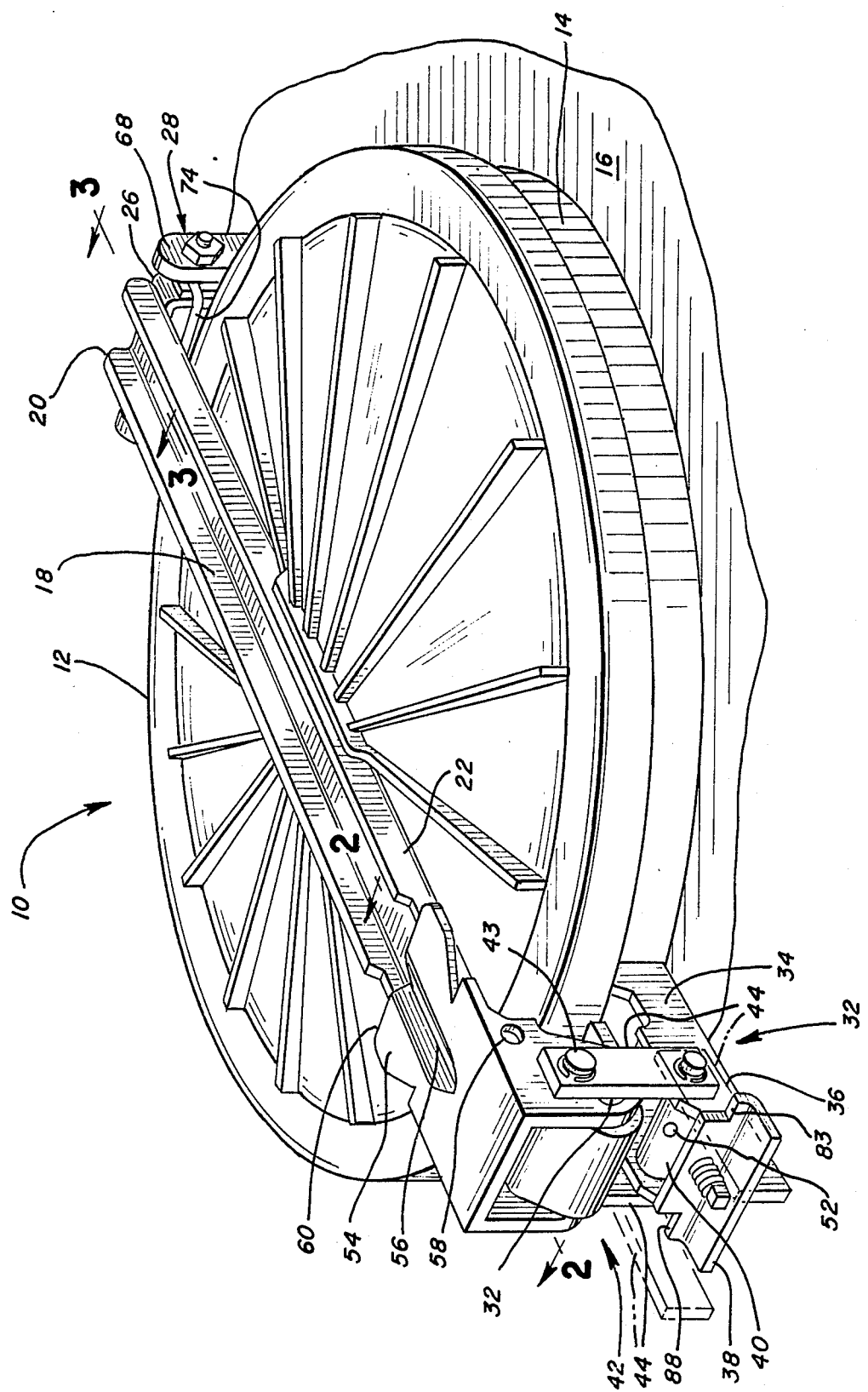
FIG. 1 is a perspective view of the hatch cover of the present invention in association with its environment.

Hatch cover assembly 10 is displayed in perspective in FIG. 1 of the drawing and includes hatch cover 12 adapted to uncover and sealingly cover a hatch opening defined by raised combing 14 which is a portion of deck 16. A locking arm 18 having a hinge end 20 and a latch end 22 extends across and beyond the hatch cover 12, and has a hatch clip 24a and 24b adjacent each end to floatingly connect the locking arm 18 to hatch cover 12. A hinge member 26, affixed to the hinge end 20 of locking arm 18, is pivotally mounted to hinge bracket means 28, on hatch combing 14, to allow the hatch cover 12 to be pivoted open or closed. Latch engagement structure or hook 30 at the latch end 22 of locking arm 18 engages latch structure 32, which is affixed to hatch combing 14, to seal the hatch opening and act as locking means for hatch cover 12. As illustrated, hinge bracket means 28 and latch mounting structure 34 are preferably affixed to combing 14. Additional information concerning the means of sealing the hatch opening is given in the Miller patents referenced above.

Figure 2:
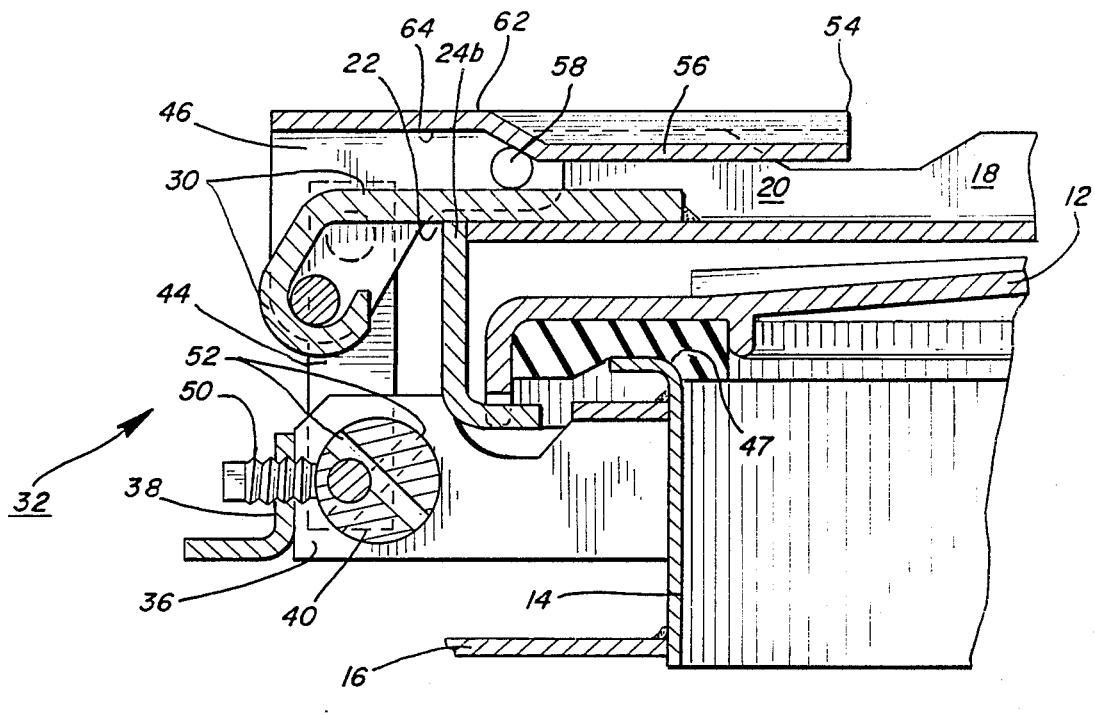
FIG. 2 is a side sectional view of the hatch cover assembly taken along the lines 2—2 of FIG. 1.
Figure 6:
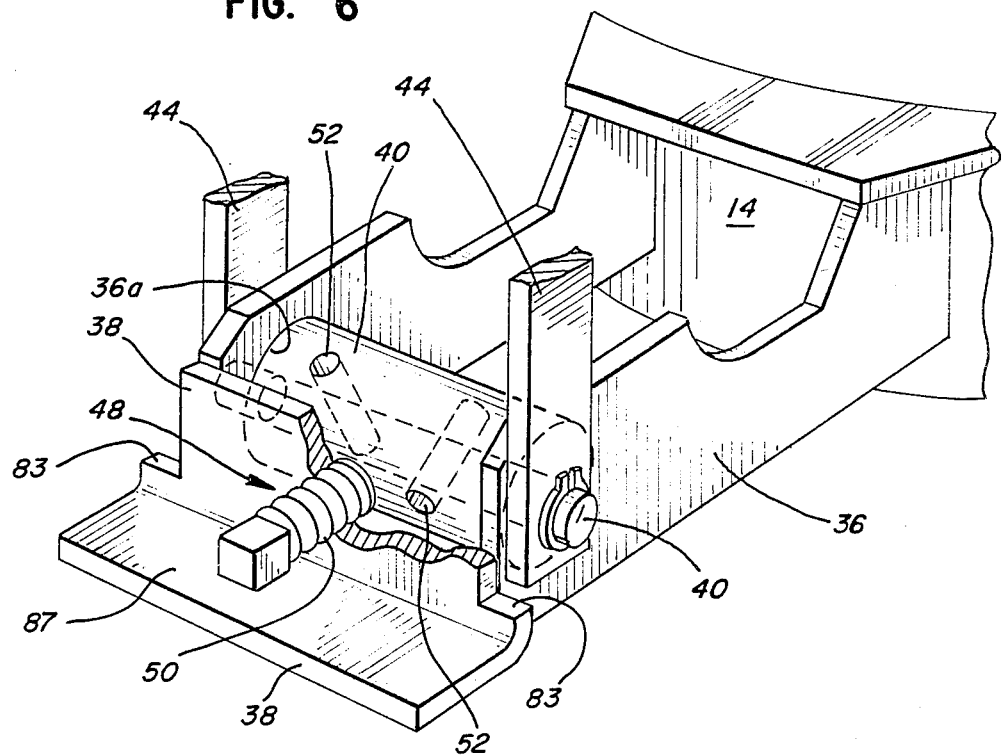
FIG. 6 is a perspective view of the adjustment means of the present invention with structure broken away to clearly show pivot means and adjustment means of the present invention.

The latch structure 32 is shown in cross section in FIGS. 2 and 4 and is shown in fragmentary perspective in FIG. 6. Latch structure 32 includes a latch bracket 34 which has latch bracket side walls 36, affixed to combing 14. Latch bracket side walls are also connected to latch bracket end wall or angle 38. Unless otherwise indicated, the generally preferred method of affixation, joinder, or connection of components of the invention is by welding. Latch bracket side walls 36 include orifices 36a to rotatably support an elongate adjustment member 40. Pivot or link means consisting of pivot arms 44, are pivoted at one end to eccentric member 41 which is eccentrically mounted with respect to the axis of rotation of adjustment member 40. The opposite ends of pivot arms 44, are pivotally mounted by pins 43 to latch or latch holder 46. Latch 46 has a bar 32 which engages the latch engagement structure or hook 30. As may be readily appreciated in viewing FIG. 2, the sealing pressure with which hatch cover 12 compresses gasket 47 against combing 14 is dependent on the height of the pivot means 43 (FIGS. 2 and 4) from the bracket 34. Gasket 47 is associated with hatch cover 12 to act as sealing means. The sealing pressure may be adjusted by rotating adjustment member 40 which is selectively restrained from rotation by locking means here shown as a threaded bolt 50 threaded through latch bracket end wall 38 to engage and restrain adjustment member 40 against rotation. Rotation of adjustment member 40 is enhanced by providing tool bearing surfaces or rotation means here shown as through bores 52. Preferably, through bores 52 are angularly displaced from each other by an equal amount so that a bore may receive a tool, such as a screw driver or bar, regardless of the angular position of adjustment member 40.

Latch 46 has a latch handle 54 extending inwardly toward the center of the hatch opening from the pivot arms 44. The latch handle 54 includes a stiffening member corrugation 56 to strengthen the handle against forces tending to rotate the latch handle about the pivot means 30. Stiffening member corrugation 56 extends in full depth from about seal holes 58 to distal end 60 of latch handle 54. Seal holes 58 extend through both latch handle 54 and locking arm 18 to allow a seal to be affixed to the structure which will be altered if the hatch cover 12 is opened. It is desirable that stiffening member corrugation 56 extend for at least half the distance between hook means 30 and distal end 60. Latch handle 54 is generally planar outside of corrugation 56 and has a substantial thickness between its top surface 62 and bottom surface 64. Preferably, stiffening member corrugation 56 is stamped into the generally planar handle 54 in a "V" shape, so that the top of the resulting vertex is slightly greater than the thickness of handle 54.

Figure 3:
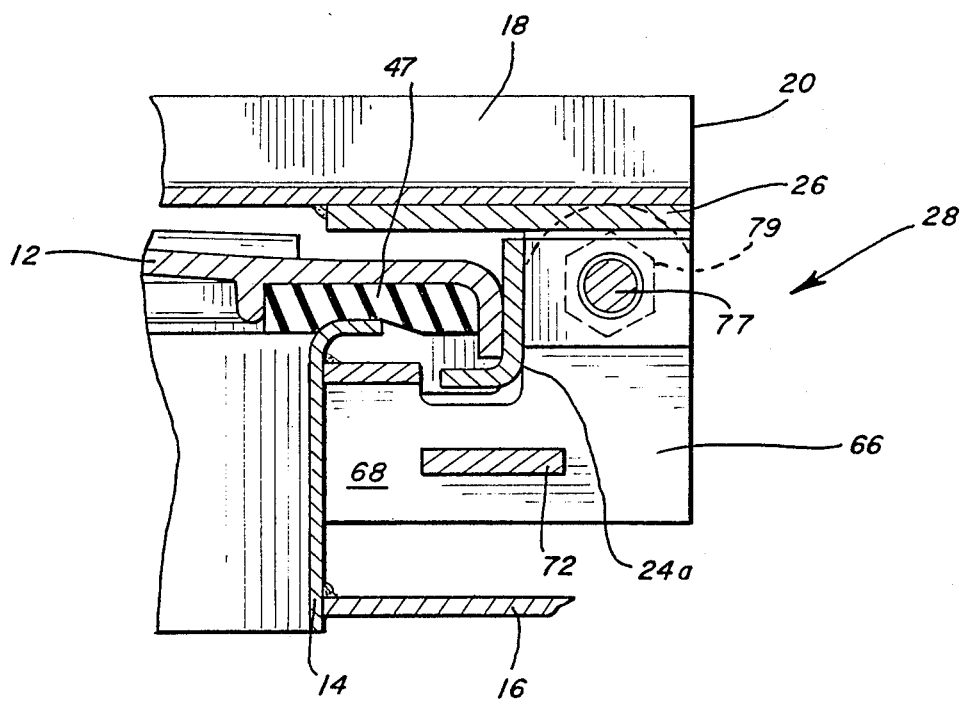
FIG. 3 is a side sectional view of a portion of the hatch cover assembly of the present invention taken along the lines 3—3 of FIG. 1.
Figure 7:
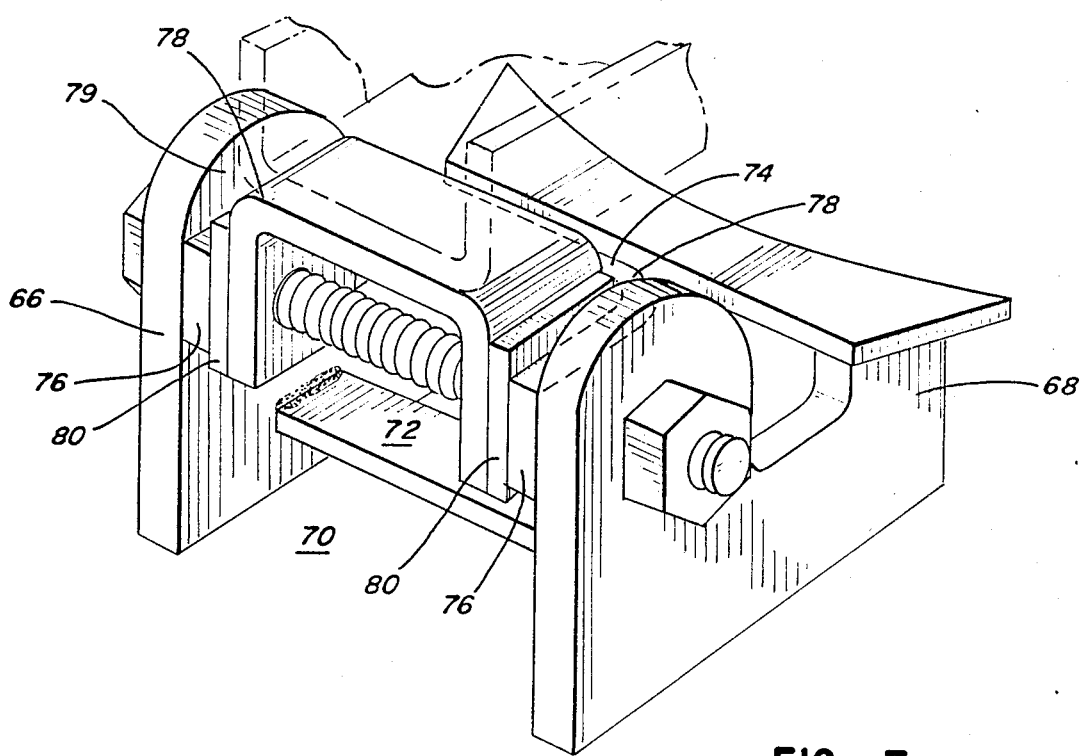
FIG. 7 is a perspective view of the stop means and shims of the present invention.

The hinge bracket means 28 is shown in cross section in FIGS. 3 and 5, and in perspective in FIG. 7. Hinge bracket means 28 includes a pair of hinge bracket walls or ears 66, 68 (FIG. 7) mounted to hatch combing 14 and defining a hinge bracket space 70 between them. Stop means 72 is affixed to the hinge bracket walls 66, and 68 to prevent the hatch cover 12 from swinging an excessive amount upon opening and striking the horizontal deck surface. As shown in FIG. 5, stop means 72 abuts an end portion 73 of locking arm 18, as hatch cover 12 is opened to limit its rotation toward the deck.

Hatch clip 24a at the hinge end 20 of the locking bar 18 includes a flat U-shaped member including clip base 74 joined to two clip sidewalls or flange or portions 76 by respective clip arcuate corner portions 78. The clip side walls 76 fit outwardly of the hinge member 26 within bracket space 70. Shims 80 are located between clip side walls 76 and hinge member 26 to bias the hinge member 26 inwardly of clip sidewalls 76 and clip arcuate portions 78. The thickness of shims 80 is approximately equal to the distance between clip base 74 and clip sidewalls 76 to avoid cocking clip 26a with respect to hinge member 26.

The arm 18 is pivotally secured to the legs 66, 68 and to the flange portions or legs 76 of the clip 74 by a securing bolt 77 which, after assembly, is fixed to a nut 79 threaded thereon and welded thereto.

In operation assuming the cover is closed as shown in FIGS. 1 and 2, the latch handle 54 is grasped at its distal end and rotated upwardly about the pivot element 43 (FIG. 4) which causes the cross-bar locking latch member 32 to elevate or rise out of the hook 30 which releases the hatch cover which may then be swung upwardly about the pin or bolt 77 to open position.

In the open position the latch handle 54 assumes the position in FIG. 4 and the links 44 seat on top of the shoulders or flange 83, 83 (FIG. 1) flanking the upright flange 85 of the angle 38.

The horizontal flange 87 of the angle 38 provides an abutment at 89 (FIG. 4) for the hinge member portion 91 secured to the handle 46. Thus the handle 46 is prevented from swinging onto the deck and injuring the ceramic interior of the car.

To close, the hatch cover is swung to closed position as shown in FIGS. 1 and 2.

The securing latch is swung upwardly from the position shown in FIG. 4 to that shown in FIG. 2 with the cross-bar latch element 32 being entered into the hook 30. The handle 54 is swung clockwise and laid over the adjacent end of the arm 18 attendant to the member 32 being lowered to bring the cover down and compressing the gasket 47. Thereafter the latch is secured by a securing device (not shown) in conventional manner.

From the foregoing description it will be apparent that modifications can be made to the hatch cover assembly of the present invention without departing from the teachings of the invention. Also, it will be appreciated that the invention has a number of advantages, some of which have been described above and others of which are inherent in the invention. Accordingly, the scope of the invention is only to be limited as necessitated by the accompanying claims.

What is claimed:

1. A hatch cover assembly for a railway car having a deck, coaming mounted thereon, a hatch cover mounted for movement to a closed position covering the coaming and an open position uncovering said coaming, and means for limited movement of the hatch cover to open position spaced from the deck to prevent damage thereto, and latching means swingable to locking association with the cover to hold the cover in closed position and pivotal to an unlocked position toward the deck, and means for limiting the pivotal movement of the latching means to prevent said locking means from stricking and damaging the deck comprising a bracket with upwardly facing surfaces flanking said latching means and engageable therewith upon downward movement thereof.

2. The invention according to claim 1, and said limiting means comprising a bracket mounted on said coaming and having a stop, and an abutment member carried by the latching means and in released position from the cover swingable toward the deck and abuttable with said stop.

3. The invention according to claim 1, and said limiting means comprising a bracket secured to said coaming, and said latching means comprising link means pivotally connected with the bracket at one of its ends and at the other end having means engageable with a cover carried portion, and said bracket having upwardly facing stops in the path of pivotal movement of said link means toward the deck attendant to release of the locking means from said cover carried portion.

4. In a lading container having a deck means including a hatch opening, a hatch coaming and a hatch cover arrangement comprising:

a hatch cover adapted to cover the hatch opening and to press on said coaming when positioned around the hatch opening, the hatch cover being pivotable toward and away from the hatch opening;

a latch engagement structure associated with the hatch cover;

a latch structure connected with the hatch coaming and adapted to engage with the latch engagement structure for securing the hatch cover against said coaming over the hatch opening;

the latch engagement structure including a latch bracket member fixedly connected with the hatch coaming and having a latch bracket aperture an elongate adjustment member supported in the latch bracket aperture in the bracket member and rotatable therein, said adjustment member defining rotation means for providing a tool bearing surface enhancing the rotation of said adjustment member within said bracket member;

locking means selectively allowing rotation of the adjustment member in the latch bracket aperture and selectively securing the adjustment member against rotation in the latch bracket aperture in one of a plurality of rotated positions of said adjustment member;

pivot means supported by the adjustment member and spaced from the axis of rotation of the adjustment member in the latch bracket aperture, whereby rotation of the adjustment member adjusts the distance of the pivot means from the deck means; and a latch arrangement operatively associated with the pivot means and adapted to be engageable with the latch engagement structure whereby rotation of the adjustment member adjusts the tightness of the closure of the hatch cover over the hatch opening, an operating arm connected with the cover, and means for pivotally connecting said arm to said coaming and including anti-cocking means for holding the cover in swinging alignment with the coaming during opening and closing of the hatch cover.

5. In a hatch cover arrangement for a lading container having a deck means defining a hatch opening, a hatch coaming about said opening, and a hatch cover adapted to cover the hatch opening and pivotally associated with the hatch coaming so that the hatch cover is pivotable toward and away from the hatch opening, a latch arrangement comprising:

a latch engagement structure operatively associated with the hatch cover;

said latch engagement structure having a first portion operatively associated with the hatch cover and said latch engagement structure having a second portion connected with the first portion and extending generally inwardly and generally toward the center of the hatch opening from the first portion, said second portion having a contact surface portion thereon;

a latch structure comprising a bracket on the coaming:

a link means having one of their ends pivotally operatively associated with the bracket and swingable toward the deck means in release position with respect to said cover, attendant to disengagement from said contact surface portion, and notch means on said bracket forming stops engageable with said link means intermediate the ends thereof, and second stop means on the bracket, and means for engaging and disengaging said link means swingable to a stopped position against said second stop means.

* * * * *